(12) United States Patent
Kompanets et al.

(10) Patent No.: US 9,350,983 B2
(45) Date of Patent: May 24, 2016

(54) THREE-DIMENSIONAL DISPLAY

(76) Inventors: Igor Nikolaevich Kompanets, Moscow (RU); Aleksandr Lvovich Andreev, Moscow (RU); Aleksandr Georgievich Sobolev, Moscow (RU)

( * ) Notice: Subject to any disclaimer, the term of this patent is extended or adjusted under 35 U.S.C. 154(b) by 126 days.

(21) Appl. No.: 13/642,817

(22) PCT Filed: Apr. 19, 2011

(86) PCT No.: PCT/RU2011/000253
§ 371 (c)(1),
(2), (4) Date: Feb. 10, 2015

(87) PCT Pub. No.: WO2011/133070
PCT Pub. Date: Oct. 27, 2011

(65) Prior Publication Data
US 2015/0304646 A1    Oct. 22, 2015

(30) Foreign Application Priority Data
Apr. 20, 2010   (RU) .............................. 2010115571

(51) Int. Cl.
*H04N 13/04*    (2006.01)
*G02B 27/22*    (2006.01)
(52) U.S. Cl.
CPC ........ *H04N 13/0488* (2013.01); *G02B 27/2292* (2013.01); *H04N 13/0409* (2013.01); *H04N 13/0459* (2013.01); *H04N 13/0495* (2013.01); *H04N 13/0497* (2013.01)

(58) Field of Classification Search
CPC .................................................. H04N 13/0488
See application file for complete search history.

(56) References Cited

U.S. PATENT DOCUMENTS

2015/0029315 A1*  1/2015  Refai et al. .................... 348/51
2015/0172646 A1*  6/2015  Smithwick

* cited by examiner

*Primary Examiner* — Timothy L Rude
(74) *Attorney, Agent, or Firm* — Donn K. Harms (57) ABSTRACT

The invention pertains to the display devices and can be used for displaying three-dimensional objects and scenes, particularly, in navigation, machine-aided drafting and engineering systems, for visualization of tomographic information and during complex operations in medicine, during modeling of three-dimensional problems in science and technology, in computer simulators and games, advertising, entertainment etc.

Here the three-dimensional display is proposed with a volumetric screen, consisting of package of light-scattering liquid-crystal modulators, and with a video projector on the basis of microdisplay for generating images of three-dimensional object sections in the planes of light-scattering liquid-crystal modulators, where as the electrooptic medium in the light-scattering liquid-crystal modulators of the volumetric screen and in the microdisplay of video projector, the liquid crystals of smectic type with ferroelectric properties (FLC) under specified boundary conditions were chosen.

1 Claim, 4 Drawing Sheets

THREE-DIMENSIONAL DISPLAY

This application claims priority to Russian Application Number 2010115571 filed on Apr. 20, 2010, and International Application Number PCT/RU2011/000253 filed on Apr. 19, 2011.

The invention pertains to the display means and can be used for display of three-dimensional objects and scenes, particularly, in navigation, machine-aided drafting and engineering systems, for visualization of tomographic information and during complex operations in medicine, for modeling of three-dimensional problems in science and technology, in computer simulators and games, advertising, entertainment etc.

The creation of systems of the most complete—three-dimensional displaying of real world will directly and indirectly influence all the spheres of human activities and initiate the creation and development of a large variety of scientific schools and technologies. That is why the attempts to create the effective three-dimensional displays haven't been stopped yet for many years, since the creation of two-dimensional displays.

Three-dimensional display often employs two-dimensional (flat) material, and the achievement of three-dimensional effect, i.e. the transformation of two-dimensional images to three-dimensional, additional optical elements and technical facilities are used, as well as complex software. However, stereoscopic (even multi-angle) and holographic principles of forming the three-dimensional images create only illusion of three-dimensional object and do not provide complete view angles of scenes with parallaxes in both orthogonal planes [1].

Figure 1:
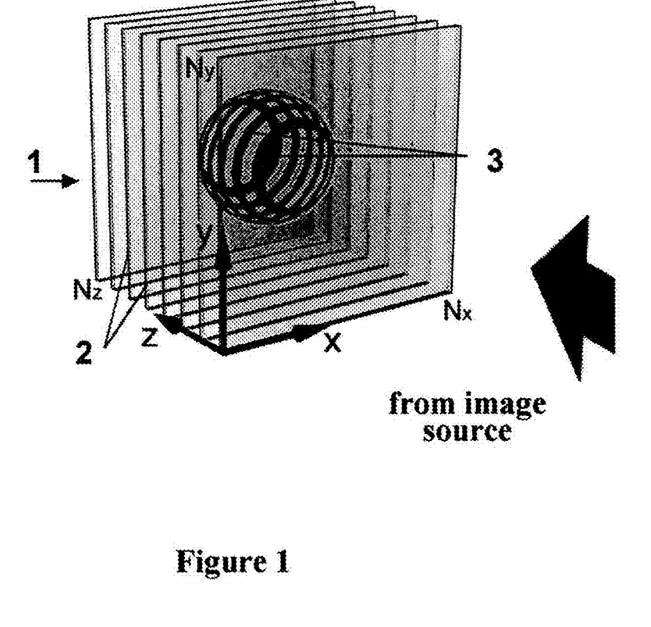
FIG. 1 depicts a scheme of three-dimensional image observation in a screen, where there is a volumetric medium or visualization zone, consisting of Nz virtual planes with a number of resolvable elements NxxNy, in which light scattering images of object sections are visualized from a generator of these images.

The greatest image realism is achieved in three-dimensional display with a volumetric screen using light scattering means for data display [1,2]. In FIG. 1 is shown the scheme of three-dimensional image observation in such a screen, where there are: volumetric medium 1 (visualization zone, or visualizer) consisting of $N_z$ virtual planes 2 with the number of resolvable elements $N_x \times N_y$, in which light scattering images 3 of object sections are visualized from a generator of these images. The main structural components of three-dimensional display with volumetric screen therefore comprise [2]:

- unit of object sections images generation, for example, light beam scanning device or video projector,
- volumetric screen as visualization area of object sections images, for example, light-scattering plate moved in free space, or multilayer medium with alternating switching of light scattering in layers,
- optical system of transferring the generated object sections images to volumetric screen, and
- unit of the control of the whole system of three-dimensional display with corresponding software.

In three-dimensional display with volumetric screen in real time (not less than 25 three-dimensional images per second) section by section the three-dimensional object layout is generated. It has all the visual characteristics of a real three-dimensional image, and that is why during its observation there occurs no eye and nervous fatigue inherent to the use of special glasses; there is no image jumps and vomiturition inherent to observation in auto-stereoscopic systems; during examination of light layout there is also no limitation in the position choice for observers. The generation of three-dimensional image with respect to its sections and its visualization may not be separated in time, i.e. they may be carried out simultaneously, and they don't require calculations of any aspect angles. Finally, what is very important for scientific and engineering applications (including military ones), due to sections visualization, the completely new functional capability occurs to observe internal spatial structure of objects or scenes and separates the fragments of interest in it.

The main condition of successful work of three-dimensional display with volumetric screens is the high speed of input and visualization of object sections images. If the time of one section image visualization cycle is $\tau_d$, then for qualitative displaying of a three-dimensional image of the whole object (scene), the correlation $\tau_d \cdot N_z \le 1/25$ seconds, should be fulfilled. Thus, the higher the number of sections $N_z$, the faster these sections should be generated and displayed in a volumetric screen, and vice versa, the known value of visualization cycle time $\tau_d$ sets the limiting number of sections $N_z$, i.e. the possible depth of object visualization along Z axis with the help of this display during work in real time. Unfortunately, the requirement for small response time of the medium to the control actions doesn't allow employment in a volumetric screen for all known materials for two-dimensional displays.

For the first time the commercial version of three-dimensional display with volumetric screen operating in real time was demonstrated in 2002 by the American company Actuality Systems, Inc. [3]. In the display called <<Perspecta Spatial 3D Platform>> the disc was used, which, together with light-scattering plate fixed on it, was rotated in free space inside the transparent hemisphere with a height of 50 cm. The size of the image visualization area was approaching 25 cm. The three-dimensional image looked like an entire image at the disc rotating speed of 25 cycles/sec and higher.

The input of sections images was carried out by means of a digital three-chip DLP video projector produced by Texas Instruments, Inc. [4] with performance up to 22 Gb/sec, that is capable to generate up to 1000 object sections per second in real time—colour images with the size of 1024×748 pixels. The video projector was created on the basis of microdisplay representing the matrix of deflected micro mirrors. This matrix is formed on a silicon substrate with control electronics, and its signals induce the fast (during 16 microseconds) deflection of thin and light micro mirror fixed on hinges. Grey scale and, consequently, colour tones in images are provided due to deflection repetition with different frequency.

The development of <<Perspecta Spatial 3D Platform>> display represented a substantial progress in the creation of three-dimensional data displays. However, the following serious drawbacks are inherent that are rather obvious from mechanical principle of sections planes shifting: the necessity of stabilization of plate rotation, operator's protection from it and vacuumizing of space inside the hemisphere; complex profile of the plate and complex software for compensation of the difference of linear velocities in different points of scatter; presence of a <<dead zone>> in periaxial space as a consequence of zero linear velocity of scatterer there; and problems of synchronization and scaling of the whole system.

The three-dimensional display with a volumetric screen is known (FIG. 2) and is free of the specified drawbacks, as described in the RF patent No. 2219588, 2003. [5]. In it the three-dimensional image is visualized in multilayer electrooptic medium during scanning of light beams in a two-dimensional plane (section image plane) and a simultaneous supply of electric voltage to the light-scattering layer of volumetric medium lying in this plane. The display doesn't contain any moving units, <<dead zone>>, and complex configuration of scattering surface.

Figure 2:
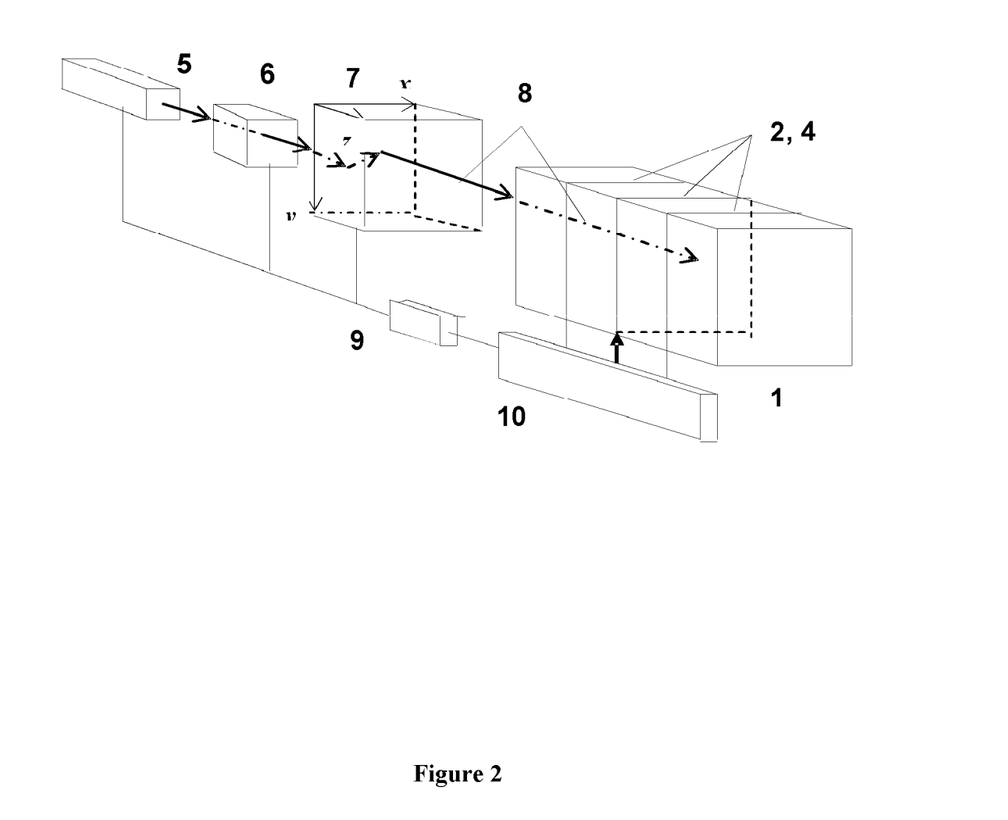
FIG. 2 shows a video projector and microdisplay scheme.

In the patent [5] referenced above, the display device is proposed, and the operation of which is explained with the scheme shown in FIG. 2. In medium 1, the functional light-scattering layer 4 is specified along z coordinate and located in the virtual plane 2 of the object section, the electric voltage is supplied from the addressing block 10, therefor switching this layer into a light-scattering state. Section image is visualized in it due to the fact that during the moment of scattering in the layer plane, the light beam 8 is scanned with respect to x and y coordinates. For image generation the light source (laser) 5, a high-frequency optical modulator 6 and two-dimensional scanner (deflector) 7 are used. Processor 9 controls sections image generation and their visualization. During alternate switching of the light scattering in all layers of the multilayer medium and simultaneous scanning of the light beam with respect to the scattering layer, all sections of three-dimensional object are visualized, and thus its integral light layout is generated. It is assumed that the colour image of a three-dimensional object is generated with the use of lasers with red, green and blue irradiation, and their beams superposition in the optical system.

The main drawback of the considered display is the insufficient speed of the unit generating sections images. Indeed, for a laser beam positioning time of 1 µs during a time of ⅟₂₅ seconds, only 40 thousands beam positions can be visualized. This is applicable, for example, for pointing of an aircrafts position in specified flight levels of controlled air zones, but this doesn't provide the visualization of standard colour image even in one plane of volumetric screen, where about a million pixels is required.

The closest analogue to the alleged invention is the three-dimensional display with volumetric screen <<DepthCube Z1024>>, demonstrated in 2004 by the American company Light Space Technology [6]. DepthCube Z1024 looks like usual TV monitor with electronic tube, but it has a prominent screen, inside of which three-dimensional images are generated [6]. The images are observed with parallax in angle space of 80°×80° in horizontal and vertical directions. All elements in section images have the same size and are visualized in the same condition, and the display reproduces very precise and rather deep images of three-dimensional objects that look as completely continuous and smooth as observed.

Figure 3:
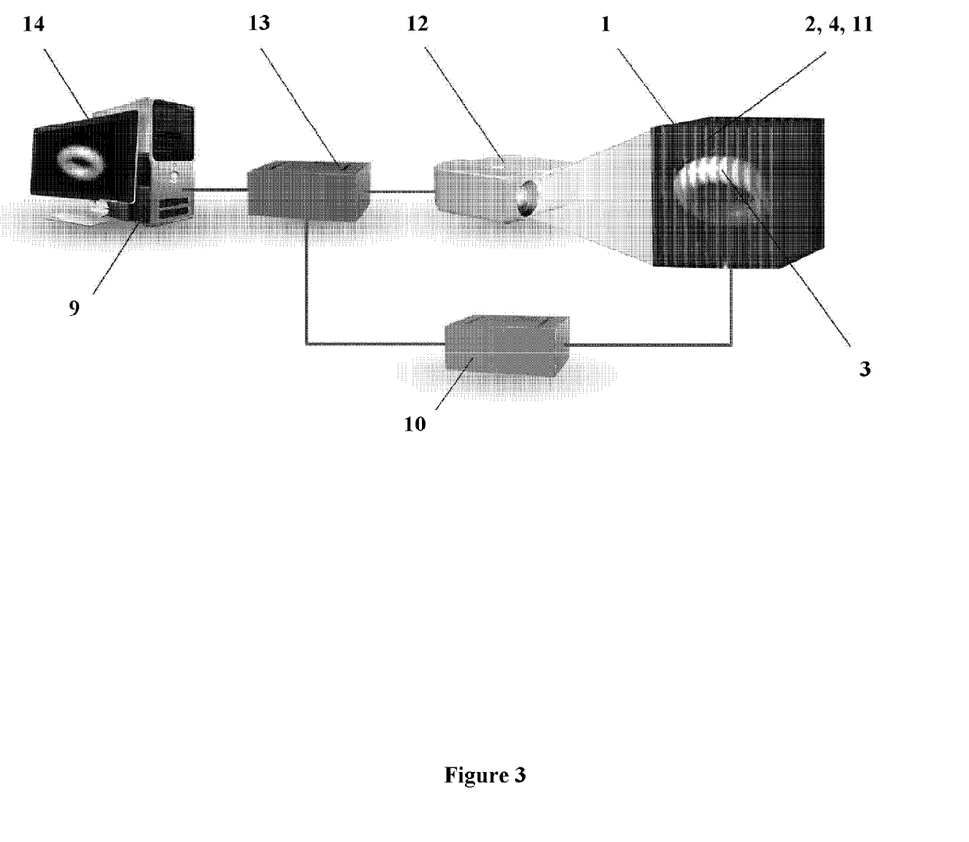
FIG. 3 depicts a mode of a three-dimensional depiction in a DepthCube Z1024 display scheme.

The scheme of <<DepthCube Z1024>> display is shown in FIG. 3. The depicted plots comprise: visualization zone 1, virtual planes 2, in which the images 3 of light layout sections of a three-dimensional object are visualized; modulators 11 with light-scattering layers 4 in planes 2, performing visualization of three-dimensional image; video projector 12; electronic data input unit 13; processor 9 with display 14; modulators addressing block 10.

Visualization zone 1 is formed here with the package of 20 electrooptic light-scattering modulators 4 parallel to each other. When one of them is at the scattering distance, the other 19 modulators keep the transparent state. Switching of any of the modulators to the scattering state and projection on the modulator of a corresponding section image is performed alternately.

The modulator material in DepthCube Z1024 display employs liquid crystal (LC) stabilized with a polymer, in which the electric field causes the transformation of LC type, namely from the initial cholesteric type (scatters the light) to the nematic one [6]. In reality switching from the light-scattering state to transparent state is performed within 240 microseconds at a voltage of 100 Volts. Reverse transition, performed after removal of electric voltage, is much longer. Eventually the dynamics of light scattering switching restricts the depth of three-dimensional images with only twenty sections.

The input of section images is provided by means of the same digital three-chip DLP video projector produced by Texas Instruments, Inc. [4] with the fastest response up to date. Unfortunately, the microdisplay on the basis of micromirrors matrix used in it doesn't possess a high reliability and long lifespan because of the mechanical principle of micromirrors deflection.

Moreover, the other essential drawback of the considered display being a prototype to the alleged invention is the insufficient speed of light-scattering modulators permitting visualization in real time of only 20 object sections. Furthermore, the addressing of these modulators is complicated with the fact that all modulators, except one maintaining a scattering state, must be under a voltage of 100 V to stay transparent in the moment of every section image input.

As can be discerned from the above, the three-dimensional display <<DepthCube Z1024>>, using liquid-crystal material in a volumetric screen and a micro-mirror three-chip DLP video projector for generation of sections images, provides real time visualization of full-format (up to 1024 pixels in a line) colour three-dimensional images with the depth of 20 sections. However, in such a system:

the restricted response speed of the liquid-crystal material doesn't allow an increase of the number of visualized sections to values of 30-100 sections, as is necessary to display the results of most practical problems solution, the employed type of liquid-crystal material requires high voltage (100 volts) for switching from the scattering state to the transparent state and doesn't provide light scattering bistable characteristic which is most acceptable for use in light-scattering volumetric medium, although the DLP video projector on the basis of micro mirror microdisplay with control silicon matrix provides a fast-response, it doesn't provide the generation in real time of 30-100 sections necessary for displaying the results of the most practical problems solution, because of the insufficient response speed of the DLP video projector, there is no possibility to implement the method of time-sequential formation of colours in images, providing the higher quality of generated image together with micromirror microdisplay manufacturing technique simplification, micromirrors matrix used in the video projector doesn't possess high operational reliability and durability (serves only 2-3 years).

A solution proposed by the present invention is the creation of reliable and durable three-dimensional display capable to generate and visualize with high quality in real time and at lower control voltage 30-100 sections of the displayed three-dimensional object. From all said, above it follows that for the solution of the problem, it is necessary to create both volumetric screen on the basis of new, faster responding multilayer electrooptical light-scattering medium, and the new, higher-speed video projector for generation of sections images of a three-dimensional object. Thus the problem is divided into two parts, and it cannot be solved in whole without solving every of these parts.

ESSENCE OF INVENTION

The solution of the problem specified above is provided by means of known three-dimensional displays with volumetric screens, comprising packages of light-scattering liquid-crystal modulators, a video projector on the basis of microdisplay, and generating sections images of three-dimensional object in planes of location of light-scattering liquid-crystal modulators, characterized in that:

1) the electrooptic medium in the light-scattering liquid-crystal modulators of volumetric screen and in the microdisplay of the video projector, the liquid crystal of smectic type with ferroelectric properties (FLC) is chosen;
2) in the modulators of volumetric screens the FLC layer thickness d, helicoid pitch $p_0$, spontaneous polarization $p_s$, elasticity modulus $K_\phi$, defining FLC deformation over azimuth angle $\phi$ with wave vector q, and electric field E, determining the director reorientation time $\tau_R$ under action of voltage control pulse with duration $\tau_{pulse}$, are chosen as follows:

$$p_0 \ll d, \quad (1)$$

$$\tau_{pulse} \geq \tau_R, \quad (2)$$

$$P_S E \gg K_\phi \cdot q^2, \quad (3)$$

on the assumption of condition of obtaining the maximum electrically-controlled light scattering on transient domains and obtaining the light scattering characteristic of bistable type;

3) for creation of the video projector microdisplay, the structure of FLCOS type was chosen [7, 8] representing a matrix of display cells—pixels with FLC (English abbreviation is FLC) on silicon plates (English abbreviation is OS on silicon) provided that the FLC layer thickness d, helicoid pitch $p_0$, elasticity modulus $K_\phi$, defining FLC deformation over azimuth angle $\phi$ with wave vector q, and boundary conditions are determined with quadratic coefficient $W_Q$ of energy of FLC layer anchoring with the boundary surface, are chosen due to condition of the provision of helicoid partial unwinding in the absence of electric field and light phase modulation with analogue type characteristic and correlate as follows:

$$K_\phi q^2 \sim W_Q/d. \quad (4)$$

Figure 4:
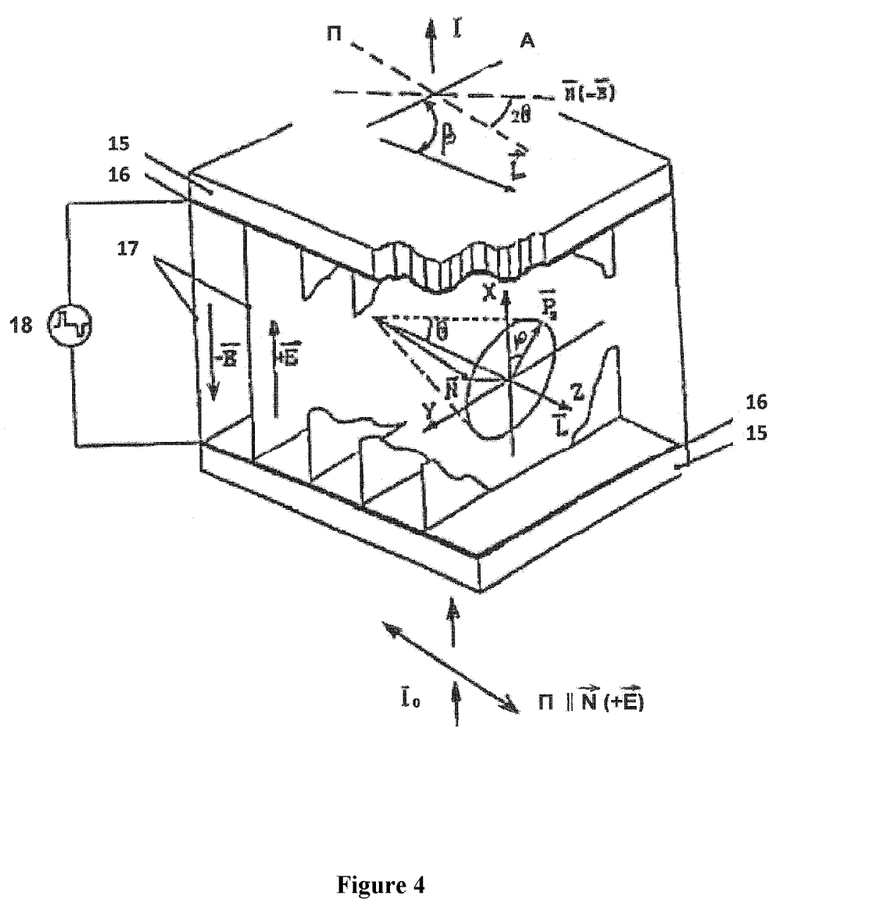
FIG. 4 shows a physical model of electrooptic cell with crystals of smectic type with ferroelectric properties.

For explanation of essence of the proposed invention let us consider the physical model of electrooptic cell with FLC shown in FIG. 4. Here 15 are the transparent dielectric plates (substrates); 16 are transparent current conducting coatings coated with orienting layer; 17 are planes in smectic layers of liquid crystal which are perpendicular to the surface of plates 15; 18 is the electric voltage source; $\overline{E}$ is the vector of electric field located in the plane of smectic layer; $\overline{N}$ is the vector showing the direction of molecules long axes orientation in smectic layers (FLC director); $\overline{P}_s$ is the vector of spontaneous polarization; $p_0$ is helix pitch; L is the normal to smectic layers; X is the coordinate axis perpendicular to plates 15; Y is the coordinate axis parallel to plates 15; Z is the coordinate axis coinciding the direction of vector $\overline{L}$; $\Theta$ is the tilt angle of molecules long axes relatively to vector $\overline{L}$ (angle between vectors $\overline{N}$ and $\overline{L}$ is a polar angle); $\phi$ is the angle in XY plane between normal to plates and vector $\overline{P}s$ (azimuth angle); $\Pi$ and A are the directions of axes of polarizer and analyser transmission; $I_0$ is the intensity of light incident onto the cell; I is the intensity of light modulated with cell; and $\beta$ is the angle between polarizer and helix axis Z.

In the FLC layer the direction of preferred orientation of the molecules long-axes (direction of a director) is determined with polar angle $\Theta$ for which they are declined relatively normal to smectic layers, and azimuth angle $\phi$ in the plane of smectic layer. Due to special stoichiometry of molecules every layer in the absence of external influence possesses spontaneous polarization, and by means of that, the FLC's have high sensitivity to action of electric field. Polarization vector $P_s$ lies in the plane of smectic layer and is directed along polar axis, and polar axes of different smectic layers are rotated relatively each other in such a way that there forms an equilibrium helically twisted structure—a helix with pitch $p_0$.

FLC layer is located between substrates 15 with current conducting coatings 16 deposited on them. The modulator or display cell is controlled with alternating sign electric pulses from the electric voltage source 18. Under application of electric field to the FLC cell, the polarization vector of every smectic layer is settled along the field lines, and molecules long-axes are located in the plane of the FLC layer at an angle $\Theta$ to helix axis. At field sign change the polarization vector turns in the opposite direction, and molecules long-axes, as cone generators, come to position $-\Theta$ in the same plane, i.e. they shift for $2\Theta$ relatively to the previous position. The molecules long-axes reorientation is followed by a birefringence change of the FLC layer, and consequently, phase modulation of passing light is transformed into amplitude modulation due to the polarizer and analyzer.

For creation of light-scattering modulator it is proposed to choose the FLC-materials with a helix pitch p0, much less than the layer thickness in which during the application of alternating-sign electric field occurs the formation of so called transient domains, i.e. the areas where some number of molecules dipole moments are located opposite to the field direction separating areas with dipoles orientations along the field direction [10]. Transient domains represent the bound state of two 180° domain walls with different signs. On achieving some critical field the walls start moving, provided that the walls of opposite signs move in opposite directions. The walls move in such a way that the volume of the energetically favorable domain increase at the expense of the energetically unfavorable domain. As a result in all smectic layers the azimuth angle $\phi$ becomes the same and equal to 0 or $\Pi$, dependently on the field direction, and vector $P_S$ is oriented along the field direction. Sign inversion of the electric field again induces the formation of transient domains and starts the process similar to one described above.

The formation of transient domains causes the occurrence of gradients of refraction index along the helix axis, and is accompanied with the intense light scattering [8]. According to the experimental data at fixed intensity of electric field (the amplitude of control voltage alternating sign pulses) the maximum efficiency of light scattering and maximum light transmission of the electrooptic cell are achieved at different pulse duration. So, for switching to a state with maximum light transmission, to which the total absence of transient domains corresponds, the pulse duration is needed 1.5-2 times greater. Consequently, at fixed pulse duration for obtaining the maximum light transmission of the cell, the pulse amplitude must be greater than for achievement of light scattering maximum efficiency.

For any intensity of the electric field sufficient for reorientation of vector of spontaneous polarization $P_S$ and FLC director, there exists minimal pulse duration, switching the structure from transparent to scattering state, and vice versa.

If pulse duration of control voltage $\tau_{pulse}$ is less than the time of director reorientation $\tau_R$, then maximum efficiency of light scattering or maximum light transmission of the electrooptic cell are not achieved.

In the case when $\tau_{pulse} \geq \tau_R$, the light scattering maximum efficiency or maximum light transmission of electrooptic cell (depending on polarity of electric field) is achieved, and after switching off of field the structure relaxes to an unperturbed state with the director helix winding. If the intensity of electric field is so high that the energy of the field interaction with the spontaneous polarization substantially exceeds FLC elastic energy: $P_S E \gg K_\phi \cdot q^2$, then after termination of the voltage pulse action, the delay of the structure relaxation to an unperturbed state with director helix winding can be achieved in several seconds. Here $K_\phi$ is the elasticity modulus, defining deformation over azimuth angle $\phi$ of director orientation, and q is the deformation wave vector as opposed to $q_0 = 2\pi/p_0$ the wave vector of unperturbed helix, characterized with pitch $p_0$.

Thus, on satisfying the conditions (1-3), concerning voltage pulse parameters, FLC layer parameters and value of the electric field E, determining director reorientation time $\tau_R$, both structure optical states, both with maximum light transmission, and with light scattering maximum efficiency, are stored within several seconds after switching off of electric field or until arrival of a pulse with opposite polarity. This scattering bistable mode is the most favourable for use of FLC in the light-scattering modulators intended for use in volumetric screen of three-dimensional display.

For creation of fast-response microdisplay it is proposed to choose the electrooptic cell on the basis of SLC, in which, as opposed to previous case, electric field performs modulation not of scattering, but of light phase, transformed by means of polaroids to intensity modulation [9]. In principle, this microdisplay is known—it is the microdisplay on the basis of FLCOS structure [7, 8]. Silicon plate of this structure's integrated circuits are created which control the liquid-crystal matrix. The information from the display is read with light from an external source at its reflection from the mirror electrodes of display cells on the surface of silicon plate.

In microdisplay on the basis of FLCOS structure by Displaytech company [7, 8] Clark-Lagerwall electrooptic effect in FLC-cells is used [11], for which the fulfilment of correlation $p_0 \gg d$ is necessary, i.e. helix pitch should be much greater than FLC layer thickness, or more correctly, $$K_\phi q^2 \ll W_Q/d. \tag{5}$$

For restricted values of electric voltage applied to the cell (less than ±3V), the implementation of control integrated circuits for achievement of high speed of light modulation it is necessary to increase the electric field intensity, i.e. to decrease the thickness of FLC layer. However, in thin FLC layers in the order of 1-1.5 μm the electrooptic switching has bistable nature due to layer strong interaction with surfaces restricting it. I.e. modulation characteristic of Clark-Lagerwall bistable display cell has only two levels: with minimum (zero) and maximum (unit) intensity of light that passed behind the analyser.

To overcome the restriction, related with the lack of halftones (grey scale), and along with it of the colour transfer, Displaytech company proposed to form grey scale by means of light modulation with different frequency [7, 8]. Herewith the silicon control matrix provided wide-band mode of light modulation allowing generation of up to 250 colour images per second. This is much more than can provide microdisplays on the basis of LCOS structure with relatively <<slow>> nematic LC, intended for displaying of video information in standard two-dimensional displays. That is why in the projection displays by Displaytech company on the basis of microdisplay with FLCOS structure, due to response speed gain, already employs sequential (alternating) change in colour instead of parallel (spatial) to simplify the display technology (instead of three microdisplays is needed only one) and improve images quality[8].

Accounting the necessity of frequency modulation in FLCOS structure for generation of grey scale, the speed of colour images generation, however, in such microdisplays is substantially (almost by an order) less than the speed of their generation in microdisplays DLP on the basis of micromirrors matrix. However the last-mentioned, as it was shown above, although up to date with the fastest response, they cannot provide the generation of 30-100 sections images in volumetric screen. Consequently, despite of potentially high frequency of light modulation with FLCOS structure, caused with the use of control silicon matrix, the Clark-Lagerwall electrooptic effect in FLC cannot provide the needed speed of colour images generation in this structure.

For creation of fast-response microdisplay on the basis of FLCOS structure the FLC is proposed to use, for which helix pitch, layer thickness and boundary conditions are chosen from the condition (4). The fulfilling of this condition provides in the absence of an electric field and the FLC layer deformation as helix partial unwinding. Herewith, the FLC layer thickness should be selected within the interval of 0.9-1.0 μm to satisfy the condition of light achromatic transmission in visible range of wavelengths at double passing (with reflection) of modulated irradiation. Moreover, the dielectric coating for better satisfaction of the condition (4) can border with the FLC layer only at one side. Under these conditions in FLC the hysteresis-free, analogue-type characteristic of light modulation is possible at frequencies of several kilohertz with response time of several tens of microseconds at voltages less than ±3V, compatible with the use of control silicon integrated circuits. As far as this characteristic already transmits grey scales, the great possibilities of control silicon matrix will be completely used for wide-band addressing of liquid-crystal matrix. As a result, FLCOS structure will be capable to display colour images with frequency up to 8 kHz, that in principle will provide both the visualization of 30-100 sections images in volumetric screen, and time-consecutive colours generation.

As can be seen from the above, the essence of the proposed invention is that in comparison with a prototype; in three-dimensional display for creation of volumetric screen light modulators on the basis of light-scattering FLC were selected, including ones with bistable characteristic of scattering switching on and off, satisfying the conditions (1-3), and for creation of high-speed video projector a microdisplay on the basis of FLCOS structure was chosen with FLC, and the parameters and boundary conditions of which satisfy the condition (4).

The technical result of proposed invention is the creation of three-dimensional display comprising:
1) a volumetric screen, consisting of a package of 30-100 fast-response light-scattering modulators on the basis of FLC, and
2) a video projector on the basis of fast-response microdisplay with FLCOS structure, using transparent (not light-scattering) low-voltage FLC and providing the generation in real time of 30-100 images of three-dimensional object sections with time-consecutive colours change.

The implementation of new volumetric screen and new video projector, and only together, provides the creation of three-dimensional display performing generation and visualization with high quality, in real time and at lower control voltage, of 30-100 sections of displayed three-dimensional object, what is up to 5 times greater than for prototype. However, light-scattering modulators and microdisplay on the basis of FLCOS structure with proposed characteristics are of separate interest, because they can be successfully used independently in different devices and systems of data displaying and processing.

The advantages of alleged three-dimensional display are implemented:
1) in the part of volumetric screen—due to FLC and boundary conditions selection for bistable modulation in it of light scattering at control voltage of 30-50 V,
2) in the part of video projector—due to FLC and boundary conditions selection for phase-polarization light modulation of analogue type with frequency up to 8 kHz at control voltage less than ±3V.

The main benefits of alleged three-dimensional display as compared to prototype finally are:
  several times increase of response speed of switching on and off of light scattering in new liquid-crystal material of volumetric display,
  decrease for 1.5-3 times of control voltage necessary for switching of liquid-crystal material from scattering state to transparent state and back,
  the provision of light scattering bistable characteristic, that is the most acceptable for use in light-scattering medium of the volumetric display,
  several times increase of images generation speed in new video projector,
  the increase of reliability and durability of video projector operation,
  the possibility of implementation of method of time-consecutive generation of colours in sections images.

Herewith from the pertinent art it is not obvious that in a three-dimensional display with volumetric screen on the basis of light-scattering modulators package and with video projector on the basis of microdisplay with control silicon matrix, all specified benefits, as for modulator, so for microdisplay, can be achieved only due to selection of corresponding liquid crystals and boundary conditions.

To improve the characteristics of light modulation in light-scattering modulators and in FLCOS structure modulating phase and polarization, can be used separately or collectively the change of the liquid-crystal substance type and composition, change of scheme, components and control mode, modification of modulators construction and FLCOS structure etc.

As can be seen from the above, the use in known three-dimensional displays of new volumetric screens and new video projectors allows creation of more fast-response, reliable and durable three-dimensional display, providing in real time generation and visualization with high quality and at lower control voltage of 30-100 sections of three-dimensional object, that is up to 5 times greater than for the prototype.

INDUSTRIAL APPLICABILITY

Proposed three-dimensional display with the new volumetric screen and new video projector is, as compared to the prototype; faster response and low-voltage provides up to 5 times greater depth of volumetric object or scene displaying with better characteristics as of light scattering, so of colours formation into images. This provides possible solutions of many practical problems in navigation, machine-aided drafting and engineering, in displaying of tomographic and other information in medicine, at modelling of three-dimensional problems in science and technology, in computer simulators and games, advertising, entertainment etc.

EMBODIMENT OF INVENTION

According to the proposed invention the experimental samples were manufactured of light-scattering modulators for volumetric screen and transparent display cells for microdisplay with FLCOS structure, in which light-scattering and phase-modulating helix FLC were used, respectively.

In the experimental samples of light-scattering modulator, due to selected parameters of FLC and boundary conditions, pulse mode of light scattering switching on, as well as mode of light scattering switching off, that satisfied three conditions (1-3), in the cells with thickness of 13-16 μm (helix pitch amounted 0.5 μm) the effective light scattering, including one with bistable characteristic was obtained.

At the pulse amplitude of ±80V for switching of electrooptic cell to the state with maximum efficiency of light scattering in experiment the pulse duration in the order of 150 μs was needed. Practically the same time is needed for switching off of the scattering process. For switching of cell to the state with maximum light transmission the pulse duration with opposite polarity in the order of 300 μs is needed. Maximum light transmission of the cell in bistable mode amounted more than 80%, and contrast correlation—not less than 100:1. Both optical states were maintained without decrease of light transmission and contrast correlation during several seconds after termination of corresponding pulses action.

In the experimental samples of reflecting the light, transparent (not light-scattering, but phase-modulating) display cells for microdisplay with FLCOS structure the parameters of FLC layer and boundary conditions for it were chosen from the condition (4). FLC layer thickness amounted 1.0 μm to satisfy the condition of achromatic light transmission of cell reflecting this light. In some cells dielectric coating of aluminium dioxide with thickness of 80 nm bordered with FLC layer only at one side. Helix pitch amounted 0.45 μm. Molecules interaction with the surface caused helix partial unwinding in the absence of electric field.

At the application of the electric field the time of electrooptic response amounted 35 μs at frequency of control voltage of 2 kHz and a field intensity 1 V/μm, and at a frequency of 4 kHz-30 μs. This data is convincing in that the display cells on the basis of proposed FLC allow obtaining of continuous modulation characteristic at the frequencies of several kilohertz with response time of several tens of microseconds for control voltage less than ±3V. Modulation characteristic almost didn't show hysteresis and was similar to one for the cells on the basis of nematic LC.

Thus, the considered examples of invention fulfilment confirm its efficiency, as well as essential advantages as compared to the prototype.

The invention claimed is:

1. Three-dimensional display with volumetric screen, consisting of the package of light-scattering liquid-crystal modulators, and with video projector on the basis of microdisplay with control silicon matrix, generating images of three-dimensional object sections in planes of light-scattering liquid-crystal modulators, characterized in that as electrooptic medium in light-scattering liquid-crystal modulators of volumetric screen and in microdisplay of video projector the liquid crystals of smectic type with ferroelectric properties (FLC) are chosen, and in modulators of volumetric screen the FLC layer thickness d, helix pitch $p_0$, spontaneous polarization $P_S$, elasticity modulus $K_\varphi$, defining FLC deformation over azimuth angle $\varphi$ with wave vector q, and electric field E, defining the director reorientation time $\tau_R$ for modulation of light-scattering under action of voltage control pulse with duration $\tau_{pulse}$, are chosen as follows:

$$p_0 << d, \quad (5)$$

$$\tau_{pulse} \geq tR,$$

and $$P_S E >> K_\phi \cdot q^2, \quad (10)$$

on the assumption of condition of maximum electrically-controlled light scattering at on transient domains and obtaining of bistable type light scattering characteristic, and in microdisplay of video projector the structure of FLCOS type is chosen, where FLC layer thickness d, helix pitch $p_0$, elasticity modulus $K_\phi$, defining FLC deformation over azimuth angle $\phi$ with wave vector q, and boundary conditions determined with quadratic coefficient $W_Q$ of energy of FLC layer anchoring with boundary surface are chosen to satisfy condition of provision of helix partial unwinding in the absence of electric field and light phase modulation with analogue type characteristic, and correlate as follows: $K_\phi q^2 \sim W_Q/d$.

* * * * *